United States Patent [19]
Lai et al.

[11] Patent Number: 5,744,926
[45] Date of Patent: Apr. 28, 1998

[54] SERVO MOTOR POSITIONING CONTROL AND POSITION RECORDING CHIP DEVICE

[75] Inventors: Chen-Kuo Lai, Taichung; Chang-Yu Ho, Kaoshiung; Jia-Cheng Ke, Hsinchu, all of Taiwan

[73] Assignee: Industrial Technology Research Institute, Hsinchu, Taiwan

[21] Appl. No.: 743,285

[22] Filed: Nov. 4, 1996

[51] Int. Cl.$^6$ ............................................. G05B 11/26
[52] U.S. Cl. .......................... 318/590; 318/602; 318/603; 318/632
[58] Field of Search ...................... 318/560, 569, 318/590, 599, 600, 601, 602, 603, 606, 608, 632

[56] References Cited

U.S. PATENT DOCUMENTS

| | | | |
|---|---|---|---|
| 3,795,851 | 3/1974 | Gage et al. | 318/602 |
| 3,824,438 | 7/1974 | Wiebe | 318/631 |
| 4,021,714 | 5/1977 | Jones et al. | 318/594 |
| 4,353,020 | 10/1982 | Veale | 318/601 |
| 5,083,072 | 1/1992 | Song | 318/571 |
| 5,134,354 | 7/1992 | Yamamoto et al. | 318/609 |

*Primary Examiner*—Bentsu Ro
*Attorney, Agent, or Firm*—W. Wayne Liauh

[57] ABSTRACT

A chip device for positioning control and position recording of a servo motor. The chip device can be operated in two modes: a first mode, and a second mode. In the first mode, the chip device can perform step command conversion, position loop control, multiple shaft synchronization, and recording of the position of the motor shaft. The step command conversion utilizes a digital-differential analysis (DDA) method to convert the step waveform in the command signal into ramp waveform for smoothed control of the servo motor. The position loop control circuit compute for the error in position and then compensates the error to generate a 12-bit 2's complement output which is subsequently converted to analog signal used to drive the servo motor. The purpose of multiple shaft synchronization is to allow a plurality of servo motor to rotate in synchronization and accurately with the same increments. The recording of the position of the motor shaft is achieved by counting the number of pulses from a position encoder coupled to the servo motor. The chip device is fast in processing speed, small in size, and reliable in operation, and allows synchronization among a plurality of servo motors. Moreover, the chip device can be built with fewer components so that production cost can be reduced.

16 Claims, 10 Drawing Sheets

SERVO MOTOR POSITIONING CONTROL AND POSITION RECORDING CHIP DEVICE

BACKGROUND OF THE INVENTION

This invention relates to servo motor position control devices, and more particularly, to a servo motor positioning control and position recording chip device implemented on a single chip for control and recording of the angular position of the shaft of a servo motor.

Conventional servo motor positioning control methods include software and hardware implementations. By software implementations, the sampling period is about 1 millisecond (ms), which is equivalent to a sampling, rate of 1 kilohertz (KHz). By contrast hardware implementations requires a sampling period of only about 0.125 microsecond (us), which is equivalent to a sampling, rate of 8 megahertz (MHz). Therefore, the software implementation are significantly slower than the hardware implementations. Although analog implementations for the position control and recording of servo motors allow real-time control of the servo motors, the operation is unstable due to the nonlinearity in the movement of the servo motors. The operation of the motor is thus unstable. Besides, it is difficult to achieve synchronization among a plurality of servo motors. This implementation also require large-size electronic components and a higher degree of difficulty in designing the associated circuits.

Figure 1:
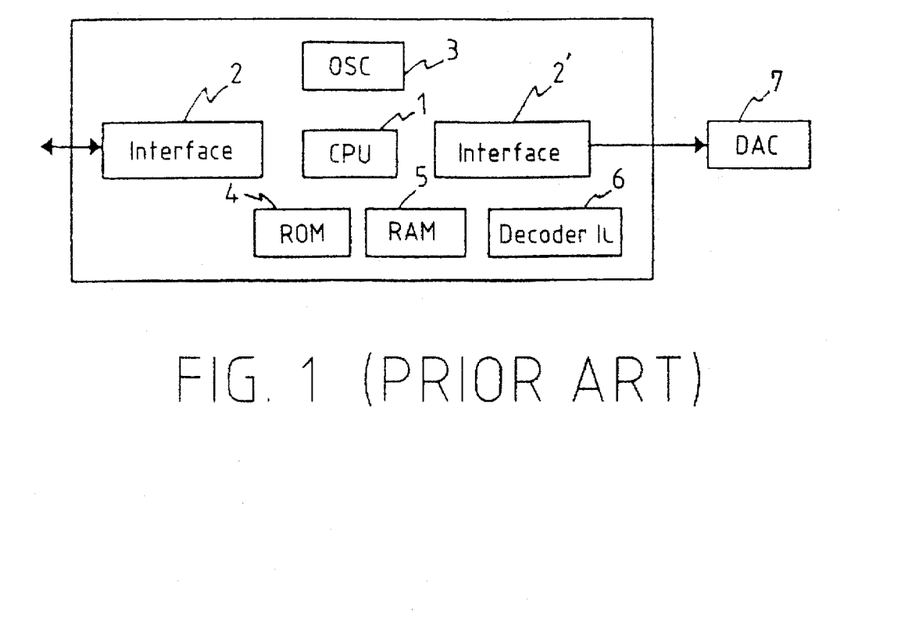
FIG. 1 is a schematic block diagram of a conventional positioning control and position recording chip device.

A conventional analog type of the positioning control and position recording apparatus for a servo motor is shown in FIG. 1, which is implemented on a printed circuit board with a number of IC components including a CPU IC and a variety of IC components. The positioning control and position recording apparatus shown here includes a CPU 1, two interfaces 2,2', an oscillator 3, a ROM (read-only memory) 4, a RAM (random-access memory) 5, a decoder 6, and a D/A (digital to analog) converter 7. This positioning control and position recording apparatus has the following disadvantages.

(1) The performance is limited by the speed of the CPU.
(2) Synchronization among a plurality of motors is not easy to achieve.
(3) Too many components are used.
(4) The production cost is high.
(5) The circuit is quite large in size.
(6) Reliability is low.
(7) The quality control (QC) for manufacture and testing is complex in procedure.

There exists, therefore, a need for a new design for positioning control and position recording chip device which can overcome the aforementioned disadvantages of the prior art.

SUMMARY OF THE INVENTION

It is therefore a primary objective of the present invention to provide a positioning control and position recording chip device for servo motors which can be implemented on a single chip for reduced occupation of circuit areas and works in two modes so as to allow easy design of the circuit and increased reliability.

It is another objective of the present invention to provide a positioning control and position recording chip device for servo motors which, when working in the first mode, allows four functions including the conversion of motor advance commands, real-time position loop control, multiple-shaft synchronization, and recording of motor position.

It is still another objective of the present invention to provide a positioning control and position recording chip device for servo motors which, when working in the second mode, includes the functions of double-shaft motor position recording, encoder index, and position latch.

It is yet another objective of the present invention to provide a positioning control and position recording chip device for servo motors which can selectively choose between externally input position command signal (CW, CCW) and linear programmable digital-differential analayer (DDA).

It is still yet another objective of the present invention to provide a positioning control and position recording chip device for servo motors which is provided with a digital-differential analayer (DDA) capable of generating a near-linear output of a positioning signal, allowing a reduced number of gates in the chip.

It is still further another objective of the present invention to provide a positioning control and position recording chip device for servo motors which allows high sampling speed, precise synchronization, high reliability, easy manufacture and maintenance, and low cost.

In accordance with the foregoing and other objectives of the present invention, a new and improved positioning control and position recording chip device is provided. The positioning control and position recording chip device can be operated in two modes: a first mode, and a second mode.

When working in the first mode, the positioning control and position recording chip device includes:

a position encoder, coupled to the servo motor, for detecting the position of the shaft of the servo motor and thereby generating a feedback signal;

a filter, coupled to the position encoder, for filtering out noises in the feedback signal;

a multiplication circuit, coupled to the filter, for multiplying the output of the filter by a preselected multiplier selected from 0, 1, 2, and 4;

a DDA circuit, responsive to an input programmed position command signal, for generating a simulated linear output;

a summation circuit, coupled to the DDA circuit and the multiplication circuit, for selectively summing up the negative of the output of the multiplication circuit to the output of the DDA circuit or to an external input position command signal;

a first programmable counter, coupled to the summation circuit, for counting the number of pulses in the output of the summation circuit and thereby generating a serial output;

an up/down counter, coupled to the fist programmable counter, for converting the serial output of the first programmable counter into a parallel output;

a saturation adjustment circuit, coupled to the up/down counter, for performing saturation adjustment to the parallel output of the up/down counter;

a digital-to-analog converter, coupled to the saturation adjustment circuit, for converting the output of the saturation adjustment circuit into an analog signal;

a driver, coupled to the digital-to-analog converter, for driving the servo motor to rotate by a specific displacement in responsive to the analog signal;

an overflow detection circuit, coupled to the up/down counter, for detecting whether an overflow occurs to the up/down counter, the overflow detection circuit generating an interrupt signal to a CPU governing the operation of the chip device to handle the overflow condition;

a counter, coupled to the multiplication circuit, for counting the number of pulses from the multiplication circuit during a predetermined period, the counter generating an actuating signal to the CPU to actuate the CPU to generate another input programmed position command signal to the chip device; and a second programmable counter second, coupled to a clock signal, for generating a base frequency signal to drive the DDA circuit.

And when working in the second mode, the positioning control and position recording chip device includes:

a position encoder, coupled to the servo motor, for detecting the position of the shaft of the servo motor and thereby generating an A/B phase feedback signal;

a filter, coupled to the position encoder, for filtering out noises in the A/B phase feedback signal;

a multiplication circuit, coupled to the filter, for multiplying the output of the filter by a preselected multiplier selected from 0, 1, 2, and 4;

an up/down counter, coupled to the multiplication circuit, for counting pulses in the output of the multiplication circuit, the count of the up/down counter representing the position of the shaft of the motor;

an index position acquirer, coupled to the up/down counter, for acquiring the index position of the position encoder for the servo motor to reset to a home position;

a control code register, for storing control codes for internal control of the chip device;

a status register for recording current status of the chip device;

a multiplexer, responsive to a selection signal from a CPU governing the operation of the chip device, for selectively outputting the output of the index position acquirer, the output of the control code register, and the output of the status register; and a control logic circuit for generating control signals for control of the chip device.

BRIEF DESCRIPTION OF DRAWINGS

The invention can be more fully understood by reading the subsequent detailed description of the preferred embodiments, with reference made to the accompanying drawings, wherein.

DETAILED DESCRIPTION OF PREFERRED EMBODIMENT

Figure 2A:
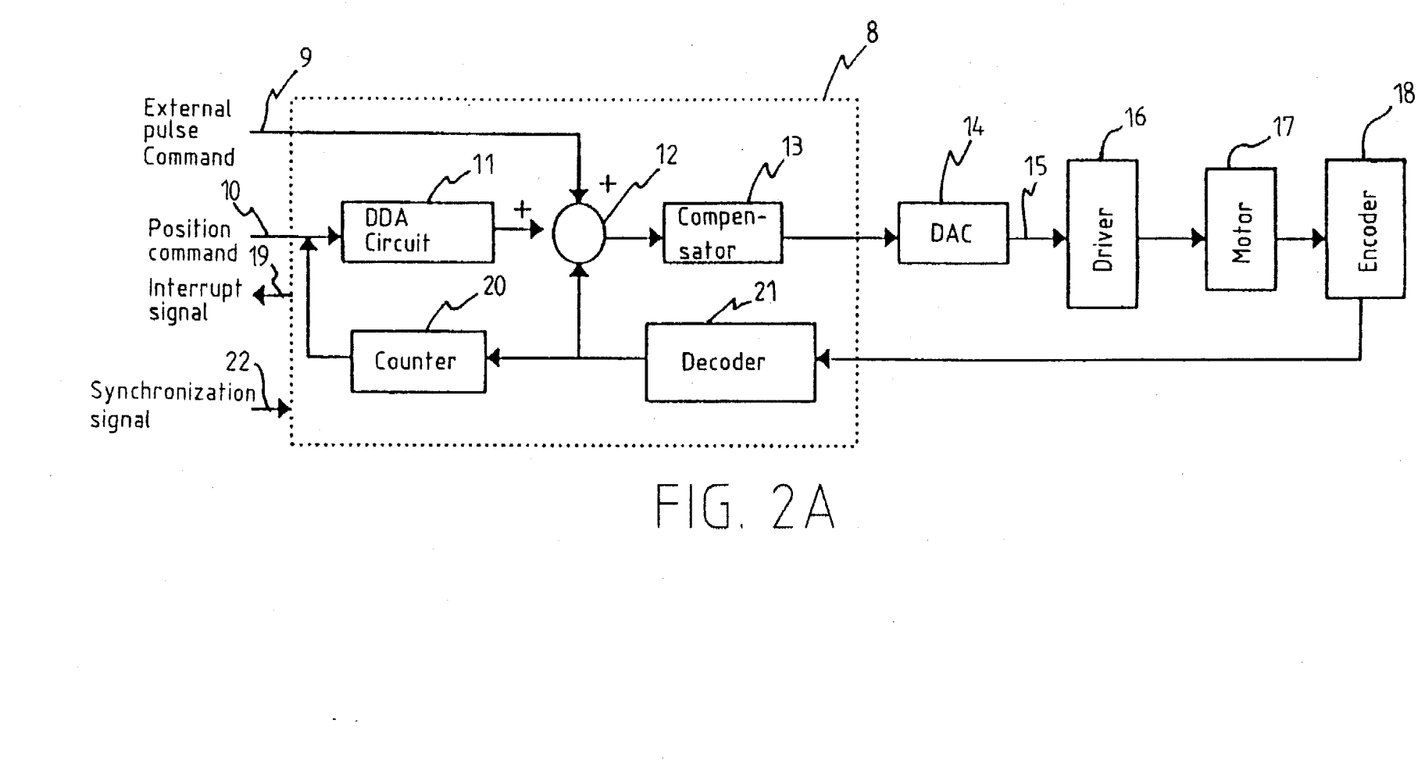
FIG. 2A is a schematic block diagram of a control system utilizing the positioning control and position recording chip device according to the present invention for control of a servo motor when working in a first mode.

The positioning control and position recording chip device according to the present invention has two modes: a first mode and a second mode. The first mode is used for the positioning control and position recording of a single-shaft motor, and the architecture thereof is shown in FIG. 2A. In this figure, the reference numeral 8 designates the positioning control and position recording chip device of the present invention, 9 designates an externally input position signal (CW, CCW), 10 designates the input of a programmable position command value, 11 designates a digital-differential analyzer (DDA) circuit, 12 designates a summation circuit, 13 disunites a compensator, 14 designates a digital-to-analog converter (DAC), 15 designates a motor speed command, 16 designates a driver, 17 designates a motor, 18 designates a position encoder, 19 designates an interrupt signal, 20 designates a counter, 21 designates a position decoder, 22 and designates a synchronization signal (actuating signal).

Further, the positioning control and position recording chip device 8 is coupled to an external control unit (not shown) via signal lines including a rotation command signal line 9, a position command signal line 10, an interrupt signal line 19, and a synchronization signal line 22. The angular position of the servo motor 17 is detected and encoded by an angular position encoder 18 and fed back to the positioning control and position recording chip device 8. The rotation command signal is a train of pulses, each pulse causing the servo motor 17 to rotate a predetermined increment of angle either in the CW (clockwise) or in the CCW (counterclockwise) direction. The full cycle of the motor shaft, i.e., 360°, is divided into N divisions, where N is an integer. Therefore, an increment of angle is equal to 360/N degrees. Besides, the rotation command signal can be generated by the DDA circuit 11 based on the simulation of a linear digital-differential analysis (DDA) method in response to the position command signal received from the signal line 10. At the same tine, the feedback signal from the angular position encoder 18 is decoded by the decoder 21. The summation circuit 12 sums up the rotation command signal from the signal line 9, the output of the DDA circuit 11, and the negative of the output of the decoder 21. In the positioning control and position recording chip device 8, real-time digital circuitry is used for the processing of the rotation command signal from the signal line 9, the output of the DDA circuit 11, and the negative of the output of the decoder 21. The resulted output of the summation circuit 12 is sent to the compensator 13 which processes the received signal to generate a 12-bit 2's complement signal. The digital output of the compensator 13 is then converted by the DAC 14 into an analog signal 15 representative of a motor speed control signal to the driver 16 which then drives the servo motor 17 to rotate according to the motor speed control signal. Concurrently, the angular position of the servo motor 17 is detected and decoded by the angular position encoder 18 and fed back to the positioning control and position recording chip device 8, forming a closed feedback control loop. In this method, the positioning control and position recording chip device 8 is set to generate an interrupt signal at a period of ΔT during input of the position command signal, allowing the external interface to input the next position value to the positioning control and position recording chip device 8 during this time. Further, the signal line 22 allows the positioning control and position recording chip device 8 to receive a synchronization signal so that two or more motors can be synchronized in the control. The period ΔT is a time interval during which the DDA circuit 11 generates the position command signal. The length of the period ΔT can be programmed through software. In a system having two or more motors under control of the positioning control and position recording chip device 8, the period ΔT is the same for all the motors. The period ΔT is the difference between two neighboring EDINT/signals. Moreover, the positioning control and position recording chip device 8 is capable of recording the angular position of the motor. The output of the angular position encoder 18 is decoded by the decoder 21 and subsequently counted by the 24-bit counter 20. The content of the counter 20 represents the recorded angular position of the motor, which can be accessed anytime by a CPU.

Figure 3A:
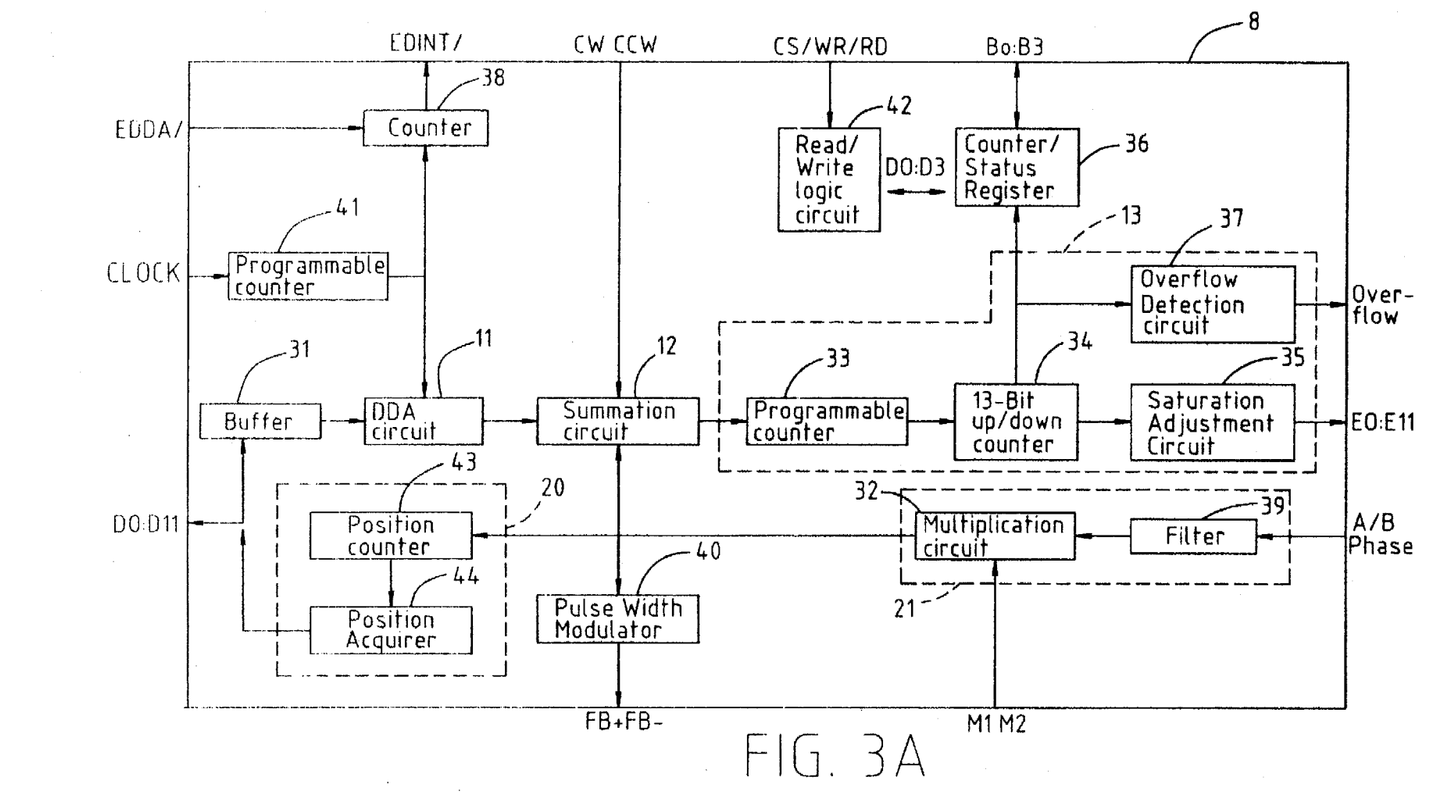
FIG. 3A is a circuit block diagram of the positioning control and position recording chip device when working in the first mode.

When working in the first mode, the active components in the positioning control and position recording chip device 8 are shown in FIG. 3A. The functionality of these components is described in the following.

When a position command signal is received, it is stored temporarily in a buffer 31 and then fed to the DDA circuit 11 which performs a digital-differential analysis on the received position command signal for a linear output.

The summation circuit 12 then synchronizes and sums up the output of the DDA circuit 11 and the negative of the output of the multiplication circuit 32. If the position command signal (CW, CCW) is present, the summation circuit 12 also adds this signal to its output. After that, the output of the summation circuit 12 is sent to the first programmable counter 33.

The first programmable counter 33 counts the pulses in the output of the summation circuit 12. The resulted count is sent to the up/down counter 34 which converts the received signal to a parallel output which is then sent to the saturation adjustment circuit 35. The output of the saturation adjustment circuit 35 is then converted by the DAC 14 into an analog signal used to drive the servo motor 17. When the up/down counter 34 overflows, its content is stored in the counter/status register 36 and the overflow detection circuit 37 will be actuated to send an interrupt signal to the CPU.

The first counter 38 counts the number of pulses during a fixed time interval. If the number reaches a preset value, the first counter 38 outputs an actuating signal to the CPU, causing the CPU to send a programmed position command signal to the positioning control and position recording chip device 8. Further, the first counter 38 can receive a synchronization signal so that the positioning control and position recording chip device 8 here can be synchronized in operation with another positioning control and position recording chip device (not shown).

The second programmable counter 41 receives the system clock signal so as to generate thereby a base frequency used to drive the first counter 38 and the DDA circuit 11. The noise filter 39 is used to filter out high-frequency noises in the feedback signal from the angular position encoder 18 prior to sending the feedback signal to the multiplication circuit 32 so that the positioning control and position recording chip device 8 can identify the feedback signal correctly.

The multiplication circuit 32 multiplies the feedback signal by a multiplier of either 0, 1, 2, or 4. The selection of which multiplier is used is determined by a set of two logic signals (M1, M2). The output of the multiplication circuit 32 is sent to the summation circuit 12 to be subtracted from the sum of the output of the DDA circuit 11 and the position command signal (CW, CCW). This multiplication circuit 32 accepts signals from quadratic incremental encoders.

The pulse width modulator 40 modulates the output of the multiplication circuit 32 so as to increase the width of the pulses therein. The output of the pulse width modulator 40 is then used to drive an external frequency-to-voltage (F/V) converter (not shown) to generate a simulation of the motor speed.

The read/write logic circuit 42 is used to perform read/write operations on the data from the counter/status register 36. In the counter 20, the position counter 43 is used to record the angular position of the motor shaft, and the position acquirer 44 is used to acquire the position data from the position counter 43 so that the position data can be read out by the CPU.

Figure 5A:
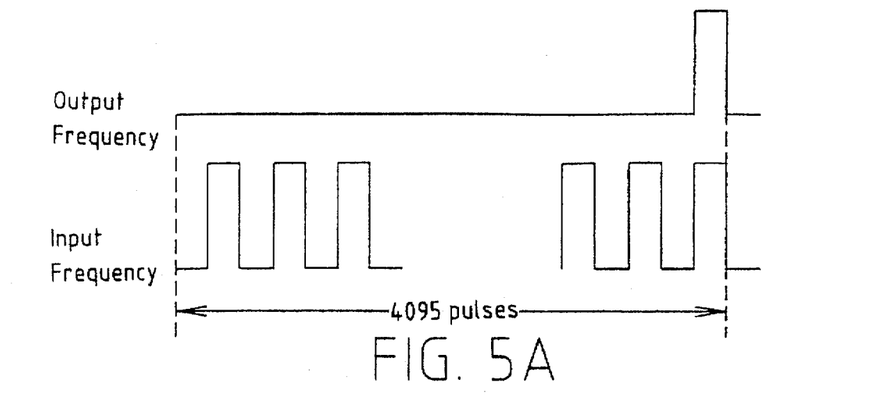
FIGS. 5A through 5C are waveform diagrams of an input frequency and an output frequency of a frequency divider utilized in the positioning control and position recording chip device of the present invention.
Figure 5B:
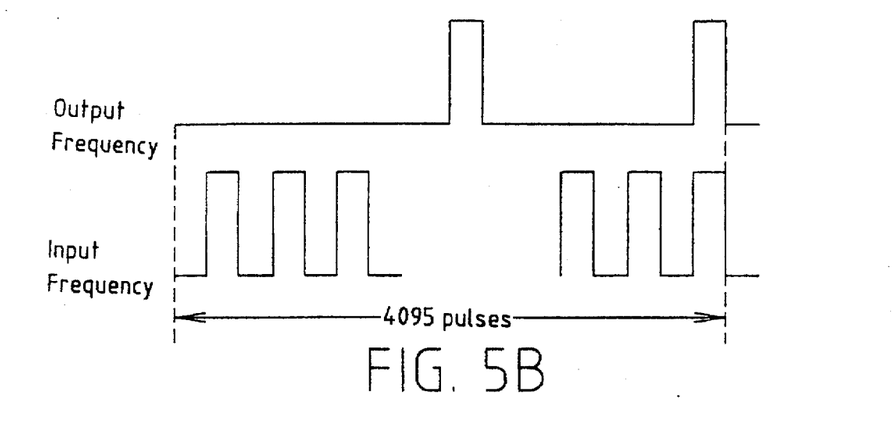
Figure 5C:
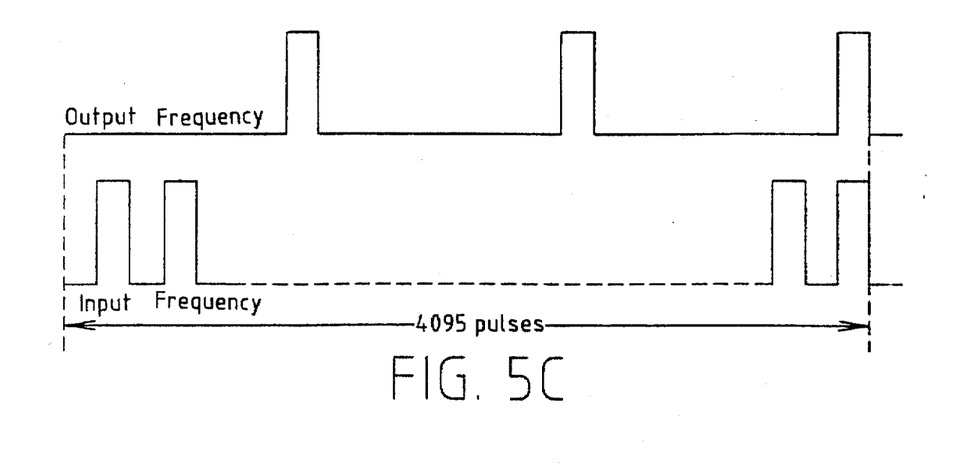

In the first mode, the positioning control and position recording chip device of the present invention utilizes a full-adder circuit to simulate the DDA circuit 11, which will be described in the following with reference to FIGS. 5A through 5C.

The full-adder circuit is based on a frequency divider which divides the input frequency in accordance with the following equation:

$$f_{out}=(M/K)*f_{in}$$

wherein $f_{in}$ in is a programmable square wave of a preset fixed frequency

M is a user-set position value;

K is set at 4095; and $f_{out}$ is the output frequency of the frequency divider which is used as a position command signal.

Accordingly, the number of square pulses per second in $f_{out}$ is M/K times that in $f_{in}$. The user can set a specific position value for M so as to obtain the output frequency with desired number of pulses per second. This output frequency is used as a position command signal to the servo motor. For example, if the user set M=1, the relationship of the waveform of $f_{out}$ with respect to that of $f_{in}$ is shown in FIG. 5A; and if M=2, the $f_{out}$-$f_{in}$ relationship is shown in FIG. 5B; and if M=3, the $f_{out}$-$f_{in}$ relationship is shown in FIG. 5C.

Through the linear DDA method, the positioning control and position recording chip device 8 generates a series of pulses with a rate of N pulses at a period of ΔT which is used as the position command signal to the servo motor. The values of N and ΔT are programmable by the user. In preferred embodiment, the values of N and ΔT are set as follows:

N: set in the range from −4095 to +4095; and

ΔT: set equal to 4095*K*CLK, where K is an integer, and 1≤K≤2048, and CLK is the period of the system clock.

After each period of ΔT, the positioning control and position recording chip device will generate an interrupt signal EDINT/, allowing external interface to input another position value to the positioning control and position recording chip device.

As shown in FIG. 3A, when the positioning control and position recording chip device 8 receives the programmed set of position command signal values (D0, D1, . . . , D11), they are first directed to the buffer 31 and then to the DDA circuit 11 (in preferred embodiment, the DDA circuit 11 is implemented by TTL 7497). The DDA circuit 11 performs a linear DDA process on the received set of data and directs the resulted output to the summation circuit 12. The clock signal is supplied via the second programmable counter 41 to the DDA circuit 11 and first counter 38. When the first counter 38 counts the output pulses from the second programmable counter 41 up to 4095, an actuating signal EDINT/ is generated and sent to the CPU. After that, the content of the first counter 38 is reset to count from 0 the output pulses from the second programmable counter 41 until the count reaches 4095 and another actuating signal EDINT/ is generated. This process repeats periodically, during which the CPU issues position command signals to the servo motor to control the operation of the same. The interval between the generation of one actuating signal EDINT/and the previous one is ΔT. The first counter 38 is not only used to count the number of pulses during each period of ΔT, but also can receive a synchronization signal EDDA/so as to allow the positioning control and position recording chip device 8 to operate in synchronization with another same type of positioning control and position recording chip device, if provided. If the positioning control and position recording chip device 8 receives externally input position command signal (CW, CCW), the output thereof will not be affected by the control period and is not a fixed value. The waveform is entirely determined by the external circuits. It is to be noted that the output of the DDA circuit 11 and the externally input position command signal (CW, CCW) are exclusive in use to each other. Either the output of the DDA circuit 11 or the externally input position command signal (CW, CCW) is combined at the summation circuit 12 with the output of the angular position encoder 18. The output of the summation circuit 12 is then sent to the first programmable counter 33 whose serial output is subsequently sent to the up/down counter 34 which converts the received serial signal into a parallel output The saturation adjustment circuit 35 then processes this parallel signal through saturation adjustment to generate a 12-bit 2's complement output (E0, E1, . . . , E11). This output is converted by the DAC 14 (FIG. 2A) into an analog signal used to drive the servo motor 17. In this process, if the up/down counter 34 overflows, the status of the up/down counter 34 is stored in the counter/status register 36, and the overflow detection circuit 37 generates an overflow signal to the CPU. The counter/status register 36 also receives three bits (B0, B1, B2) from external circuit. The read/write logic circuit 42 reads the values of (B0, B1, B2) and the current content of the up/down counter 34 for judgment by software to determine the actions to be taken. The B0 bit is, for example, coupled to the HOME sensor on the servo motor such that when the motor is performing a HOME operation, the CPU can learn from the counter/status register 36 whether the motor has been reset to the HOME position or not. Further, the pulse width modulator 40 is used to increase the width of the pulses in the feedback signal from the decoder 21 to thereby generate the output (FB+,FB−). In this preferred embodiment, the pulse width modulator 40 modulates the pulses into a fixed width of 31 times the period of the clock signal. The output of the pulse width modulator 40 is used to drive an external frequency-to-voltage (F/V) converter (not shown) so as to generate a simulation of the motor speed.

FIGS. 4A through 4D are detailed circuit diagrams of the summation circuit 12. The signals CMD+,CMD− are the outputs of the full-adder circuit. A polarity signal is included in these signals for indicating the up/down counter 34 to count either in the positive direction or in the negative direction. The signals FB+,FB− are the outputs of the multiplication circuit 32, which are synchronized by the clock signal. The signals UP, DOWN are coupled to the first programmable counter 33.

Figure 6:
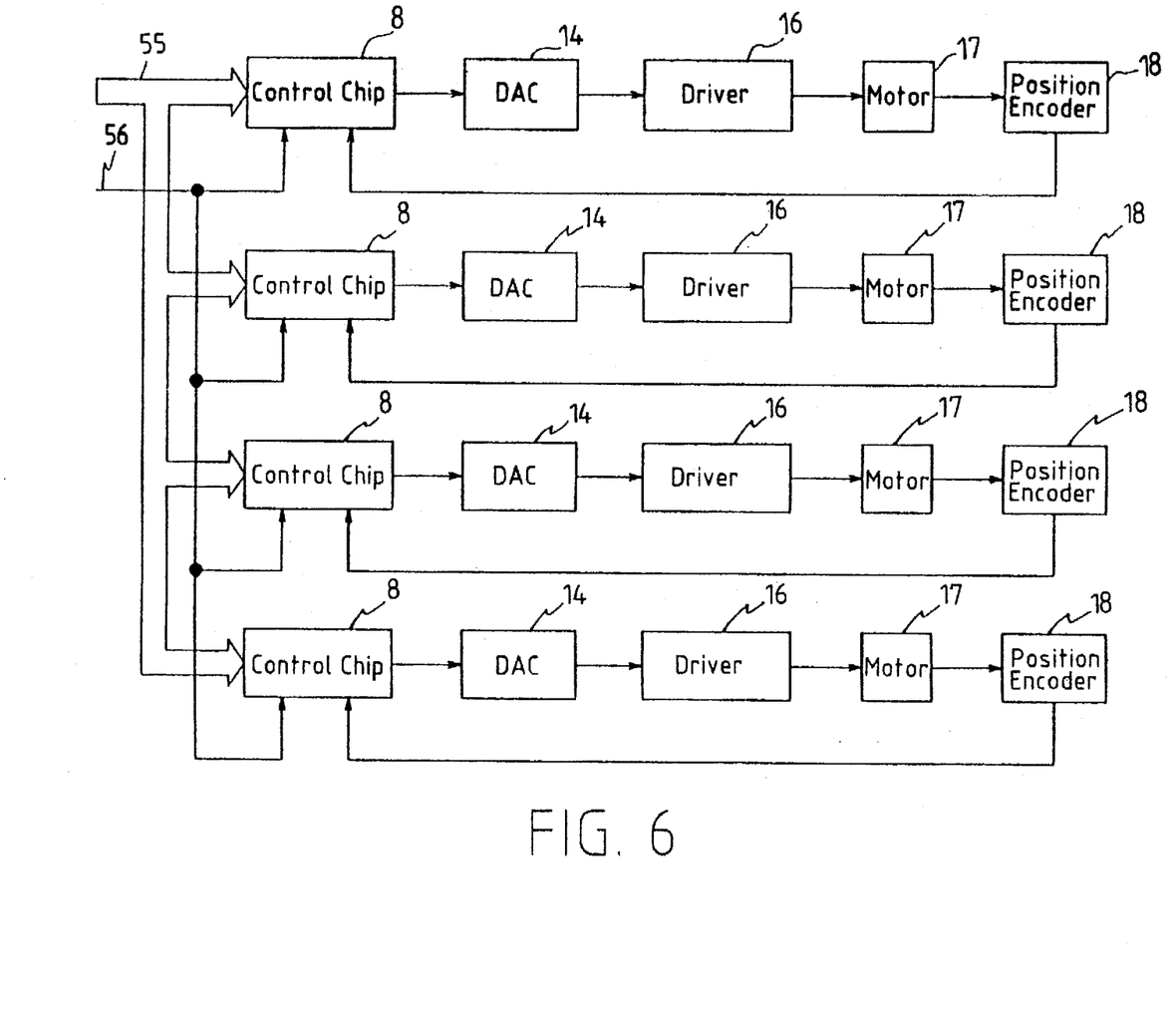
FIG. 6 is a schematic block diagram of a control system utilizing a plurality of the positioning control and position recording chip device of the present invention for synchronized control of a plurality of servo motors.

FIG. 6 shows the architecture of a plurality of the positioning control and position recording chip device 8 when used for synchronized control of a plurality of servo motors 17. The data bus 55 is used to transmit the control signals from the CPU, and the signal line 56 is used to transmit the synchronization signal from the CPU.

Figure 2B:
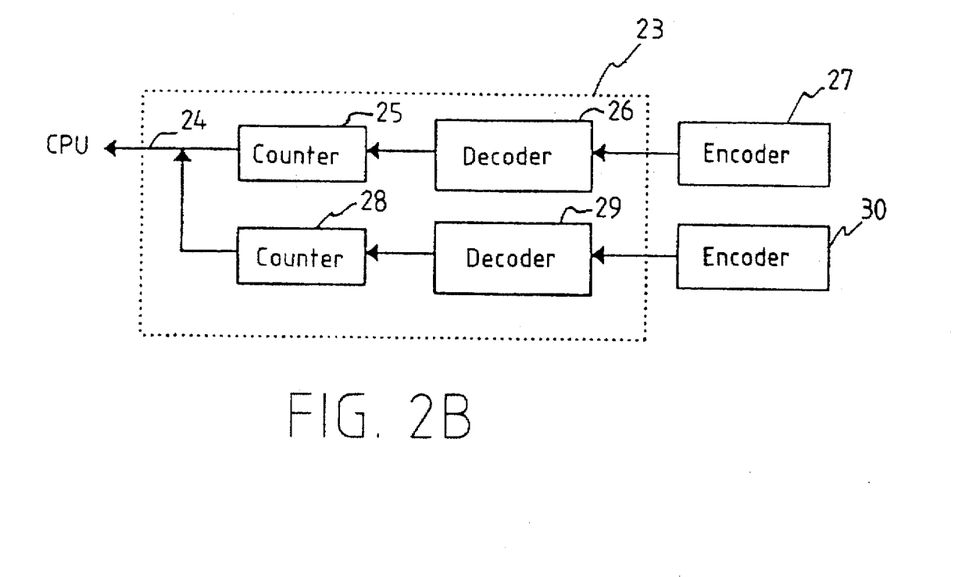
FIG. 2B is a schematic block diagram of a control system utilizing the positioning control and position recording chip device according to the present invention for control of a servo motor when working in a second mode.

FIG. 2B shows the architecture of a control system that uses the positioning control and position recording chip device according to the present invention when working in the second mode for control of a double-shaft motor. The reference numeral 23 indicates the chip of the positioning control and position recording chip device according to the present invention, 24 indicates a signal line between the positioning control and position recording chip device and the CPU, 25 indicates a first counter, 26 indicates a first decoder, 27 indicates a first position encoder for the first shaft of the motor, 28 indicates a second counter, 29 indicates a second decoder, and 30 indicates a position encoder for the second shaft of the motor. The controls for the first shaft and the second shaft of the motor are the same. To simplify the description, only the control for the first shaft of the motor is given in the following. The output of the position encoder 27 is decoded by the decoder 26, and the output pulses of the decoder 26 are counted by the counter 25 which is a 24-bit up/down counter. The CPU can determine the position of the first shaft of the motor by reading out the content of the counter 25.

Figure 3B:
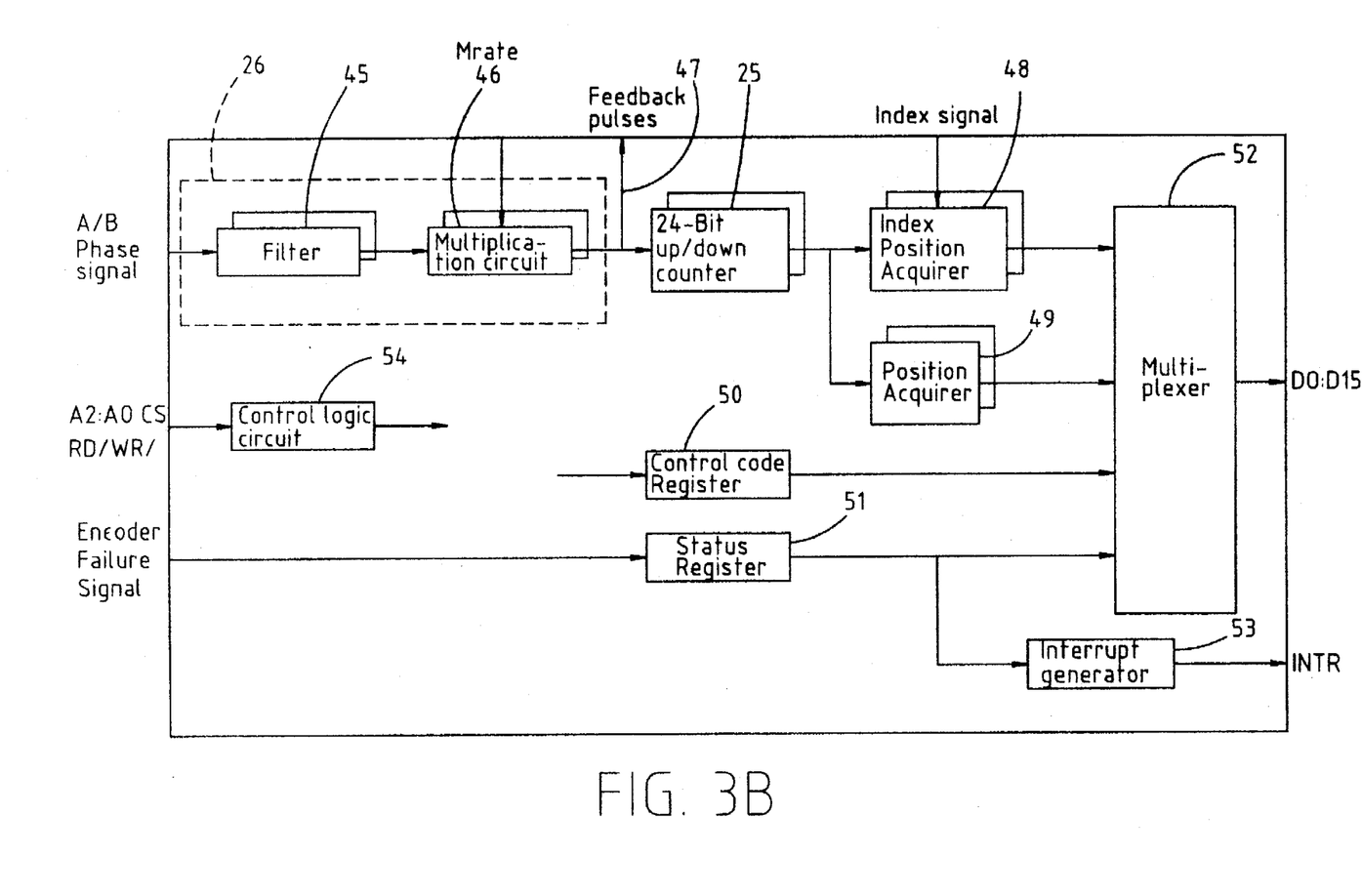
FIG. 3B is a circuit block diagram of the positioning control and position recording chip device when working in the second mode.
Figure 4A:
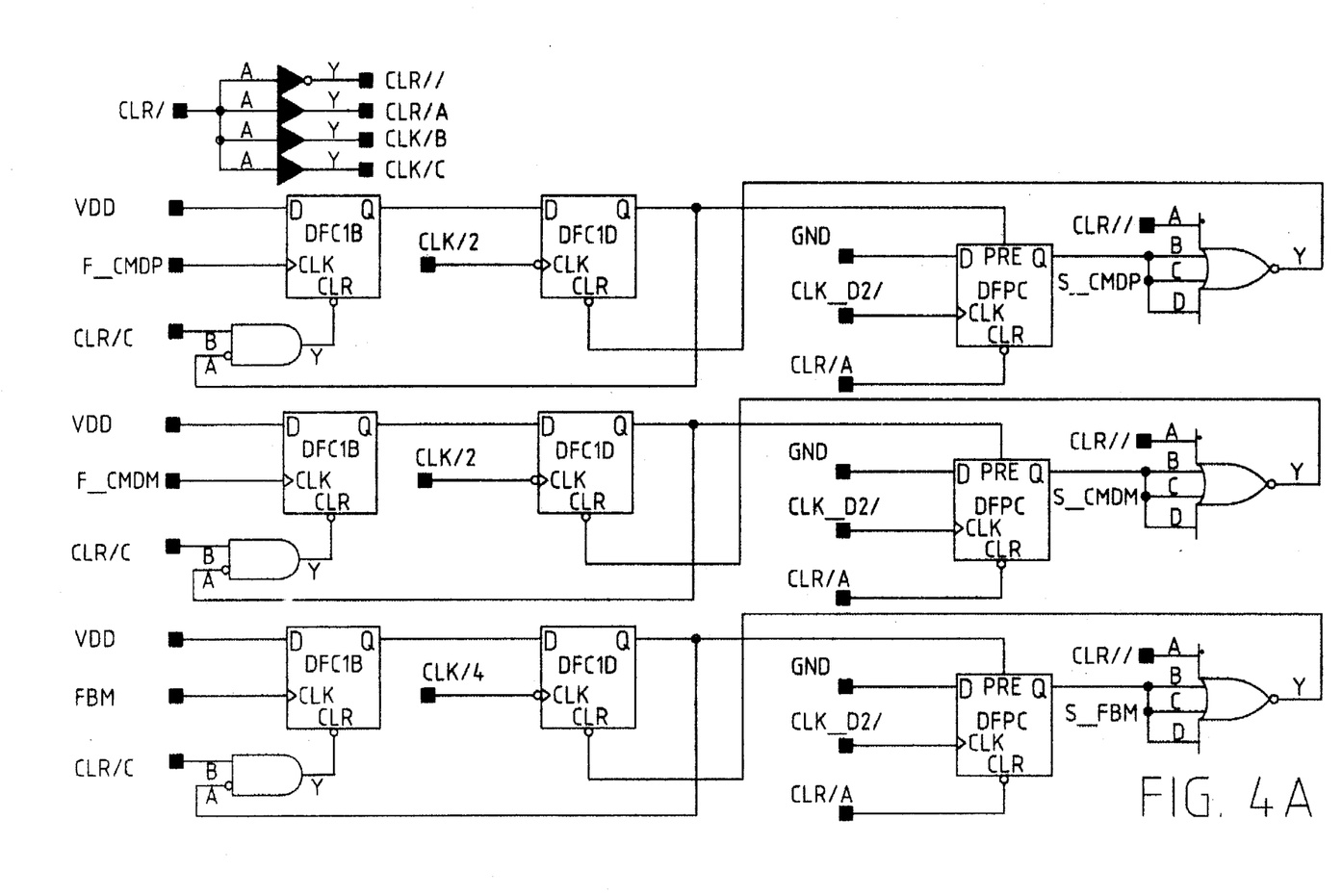
FIGS. 4A through 4D are detailed circuit diagrams of a summation circuit utilized in the positioning control and position recording chip device of FIG. 3A.
Figure 4B:
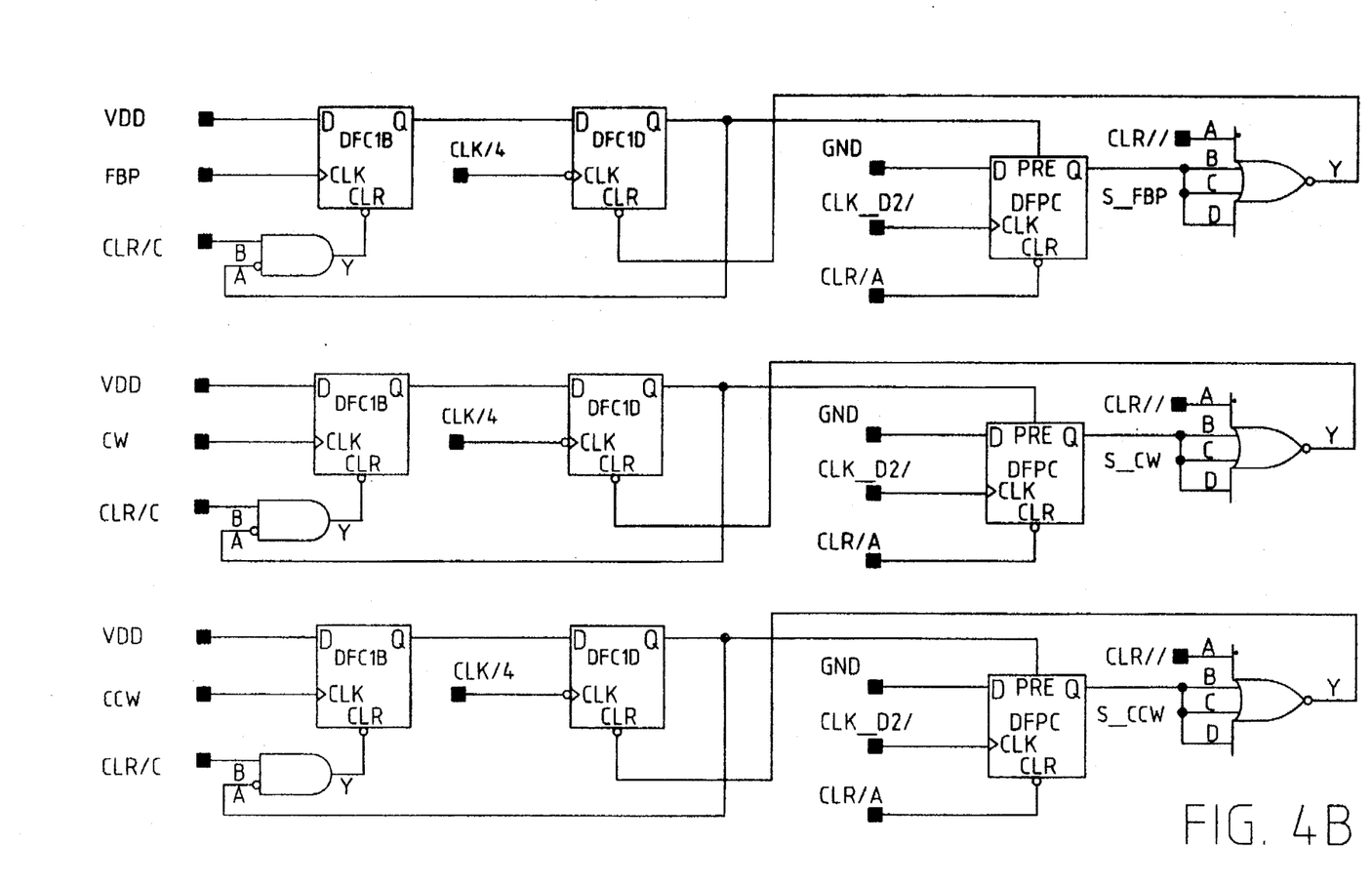
Figure 4C:
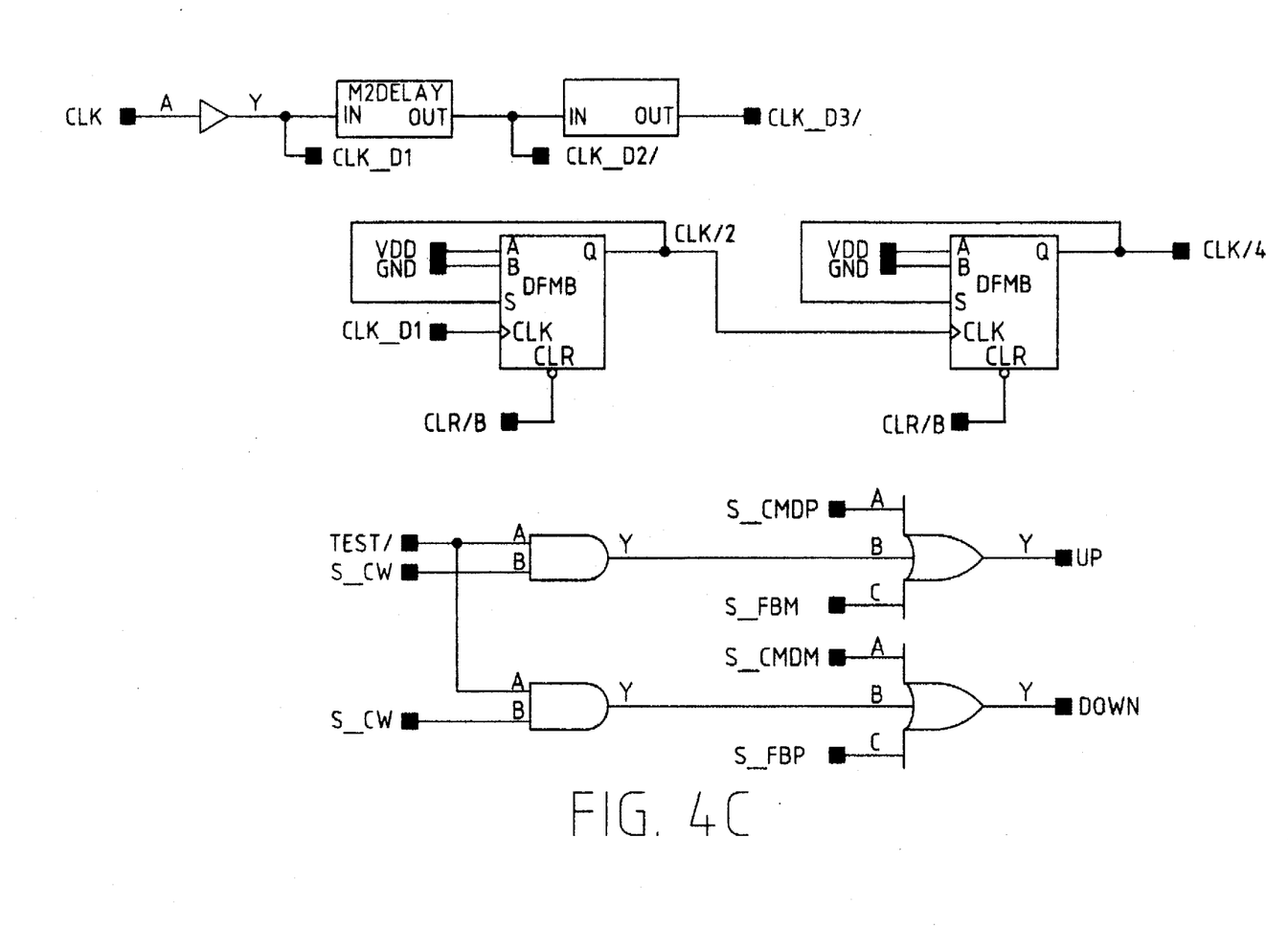
Figure 4D:
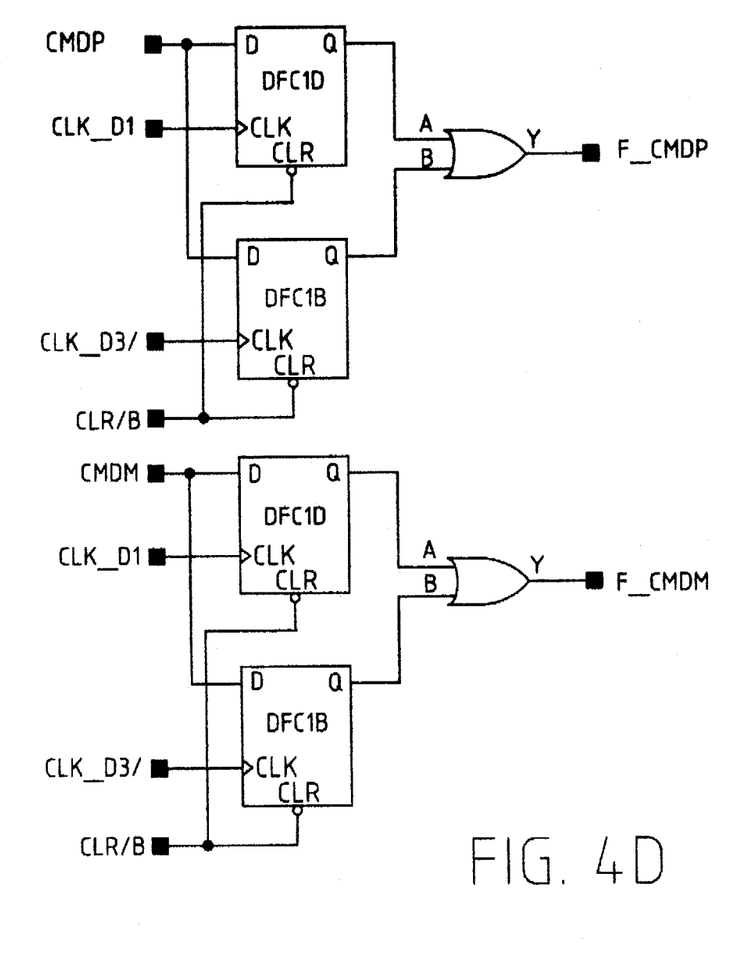

FIG. 3B shows the circuit structure of the positioning control and position recording chip device when working in the second mode. The functionality of these components is described in the following.

The filter 45 is used to filter out the noises in the A/B phase signal generated by the encoder 27, and the multiplication circuit 46 is used to multiply the A/B phase signal by a multiplier of either 0, 1, 2, or 4 to thereby convert the phase signal to a pulse signal 47 for external monitoring of the operation. The pulse signal is also sent to the 24-bit up/down counter 25 which counts the number of the pulses thereof. The count by the 24-bit up/down counter 25 represents the position of the shaft of the motor. An external circuit can read the content of the 24-bit up/down counter 25 via the position acquirer 49 and the multiplexer 52.

The index position acquirer 48 is used to acquire the index position of the position encoder. When the motor is performing a HOME operation, it requires the use of the index position for accurate resetting of the motor to the HOME position. The control code register 50 is used to store control codes that are used for internal control of the positioning control and position recording chip device.

The status register 51 is used to record the current status of the operations of the positioning control and position recording chip device, such as the failure signal from the position encoder and the overflow of the 24-bit up/down counter 25. In the event of a certain condition, the interrupt generator 53 will generate a corresponding interrupt signal to the CPU.

The multiplexer 52 is used to select one of the following signals: the output of the index position acquirer 48, the output of the position acquirer 49, the output of the control code register 50, and the output of the status register 51, to the CPU.

The control logic circuit 54 is used to generate the required control signals for the positioning control and position recording chip device.

In conclusion, the positioning control and position recording chip device according to the present invention has the following features. First, it has two modes; and second, it includes a real-time digital closed-loop servo position controller. Third, it utilizes the digital differential analysis (DDA) method for the generation of a motor position command signal which can fast control the position of the motor. Fourth, the motor can be continuously controlled to rotate to desired positions by means of the generation of interrupt signals. Fifth, two or more motors can be controlled in synchronization. Sixth, the 12-bit 2' complement output can be directly coupled to any 12-bit DACs to generate the desired analog signal for controlling the motor speed control signal. Seventh, motor positions can be recorded by counters for easy readout. Eighth, the positioning control and position recording chip device is fully implemented by digital hardware circuitry. These features allows the positioning control and position recording chip device according to the present invention to have the following advantages: (1) high-speed sampling (250ns max.), (2) accurate synchronization, (3) capable of being implemented on a single chip, (4) small-size, (5) low cost, (6) high reliability, and (7) easiness in mass production and maintenance.

Moreover, the positioning control and position recording chip device can be devised with various types of DDA circuits that can generate position command signals with linear or trapezoidal pulses for increased flexibility and performance of the control system, and for integrating the control of an increased number of shafts on the single chip.

The invention has been described using exemplary preferred embodiments. However, it is to be understood that the scope of the invention is not limited to the disclosed preferred embodiments. On the contrary, it is intended to cover various modifications and similar arrangements as would be apparent to those of skilled in the art. The scope of the claims should be accorded the broadest interpretation so as to encompass all such modifications and similar arrangements.

What is claimed is:

1. A servo motor positioning control and position recording chip device which comprising:

a position encoder, coupled to the servo motor, for detecting the position of the shaft of the servo motor and thereby generating a feedback signal;

a filter, coupled to said position encoder, for filtering out noises in the feedback signal;

a multiplication circuit, coupled to said filter, for multiplying the output of the filter by a preselected multiplier selected from 0, 1, 2, and 4;

a DDA circuit, responsive to an input programmed position command signal, for generating a simulated linear output;

a summation circuit, coupled to said DDA circuit and said multiplication circuit, for selectively summing up the negative of the output of said multiplication circuit to the output of said DDA circuit or to an external input position command signal;

a first programmable counter, coupled to said summation circuit, for counting the number of pulses in the output of said summation circuit and thereby generating a serial output;

an up/down counter, coupled to said first programmable counter, for converting the serial output of said first programmable counter into a parallel output;

a saturation adjustment circuit, coupled to said up/down counter, for performing saturation adjustment to the parallel output of said up/down counter;

a digital-to-analog converter, coupled to said saturation adjustment circuit, for converting the output of said saturation adjustment circuit into an analog signal;

a driver, coupled to said digital-to-analog converter, for driving the servo motor to rotate by a specific displacement in responsive to the analog signal;

an overflow detection circuit, coupled to said up/down counter, for detecting whether an overflow occurs to said up/down counter, said overflow detection circuit generating an interrupt signal to a CPU governing the operation of said chip device to handle the overflow condition;

a counter, coupled to said multiplication circuit, for counting the number of pulses from said multiplication circuit during a predetermined period, said counter generating an actuating signal to the CPU to actuate the CPU to generate another input programmed position command signal to said chip device; and a second programmable counter, coupled to a clock signal, for generating a base frequency signal to drive said DDA circuit.

2. A servo motor positioning control and position recording chip device of claim 1, further comprising:

a counter/status register, coupled to said up/down counter, for recording the status of said up/down counter when said up/down counter overflows; and a read/write logic circuit, coupled to said counter/status register, for read out data from and write data into said counter/status register.

3. A servo motor positioning control and position recording chip device of claim 1, further comprising:

a pulse width modulator, coupled to said multiplication circuit, for increasing the width of the pulses in the output of said multiplication circuit and thereby generating an output to an external frequency-to-voltage converter to generate a simulation of the motor speed.

4. A servo motor positioning control and position recording chip device of claim 1, further comprising:

a position counter, coupled to said multiplication circuit, for counting the number of pulses from a said position encoder, the count of the pulses representing the current position of the shaft of the motor.

5. A servo motor positioning control and position recording chip device of claim 1, wherein said position encoder is a quadratic incremental encoder.

6. A servo motor positioning control and position recording chip device of claim 1, wherein said counter counts the output pulses from said second programmable counter up to 4095 and thereby generates an actuating signal EDINT/.

7. A servo motor positioning control and position recording chip device which comprising:

a position encoder, coupled to the servo motor, for detecting the position of the shaft of the servo motor and thereby generating an A/B phase feedback signal;

a filter, coupled to said position encoder, for filtering out noises in the A/B phase feedback signal;

a multiplication circuit, coupled to said filter, for multiplying the output of the filter by a preselected multiplier selected from 0, 1, 2, and 4;

an up/down counter, coupled to said multiplication circuit, for counting pulses in the output of said multiplication circuit, the count of said up/down counter representing the position of the shaft of the motor;

an index position acquirer, coupled to said up/down counter, for acquiring the index position of said position encoder for the servo motor to reset to a home position;

a control code register, for storing control codes for internal control of said chip device;

a status register for recording current status of said chip device;

a multiplexer, responsive to a selection signal from a CPU governing the operation of said chip device, for selectively outputting the output of said index position acquirer, the output of said control code register, and the output of said status register; and a control logic circuit for generating control signals for control of said chip device.

8. A servo motor positioning control and position recording chip device of claim 7, wherein said status register records status data including failure signal from said position encoder and overflow of said up/down counter.

9. A servo motor positioning control and position recording chip device of claim 7, wherein said the multiplication circuit multiplies the A/B phase signal by a multiplier of either 0, 1, 2, or 4 to thereby convert the phase signal to a pulse signal for external monitoring of the operation of said chip device.

10. A servo motor positioning control and position recording chip device which comprising:

a position encoder, coupled to the servo motor, for detecting the position of the shaft of the servo motor and thereby generating a feedback signal;

a filter, coupled to said position encoder, for filtering out noises in the feedback signal;

a multiplication circuit, coupled to said filter, for multiplying the output of the filter by a preselected multiplier selected from 0, 1, 2, and 4;

a DDA circuit, responsive to an input programmed position command signal, for generating a simulated linear output;

a summation circuit, coupled to said DDA circuit and said multiplication circuit, for selectively summing up the negative of the output of said multiplication circuit to the output of said DDA circuit or to an external input position command signal;

a first programmable counter, coupled to said summation circuit, for counting the number of pulses in the output of said summation circuit and thereby generating a serial output;

an up/down counter, coupled to said first programmable counter, for converting the serial output of said first programmable counter into a parallel output;

a saturation adjustment circuit, coupled to said up/down counter, for performing saturation adjustment to the parallel output of said up/down counter;

a digital-to-analog converter, coupled to said saturation adjustment circuit, for converting the output of said saturation adjustment circuit into an analog signal;

a driver, coupled to said digital-to-analog converter, for driving the servo motor to rotate by a specific displacement in responsive to the analog signal;

an overflow detection circuit, coupled to said up/down counter, for detecting whether an overflow occurs to said up/down counter, said overflow detection circuit generating an interrupt signal to a CPU governing the operation of said chip device to handle the overflow condition;

a counter, coupled to said multiplication circuit, for counting the number of pulses from said multiplication circuit during a predetermined period, said counter generating an actuating signal to the CPU to actuate the CPU to generate another input programmed position command signal to said chip device; and a second programmable counter, coupled to a clock signal, for generating a base frequency signal to drive said DDA circuit; and when working in a second mode, said chip device comprising:

a position encoder, coupled to the servo motor, for detecting the position of the shaft of the servo motor and thereby generating an A/B phase feedback signal;

a filter, coupled to said position encoder, for filtering out noises in the A/B phase feedback signal;

a multiplication circuit, coupled to said filter, for multiplying the output of the filter by a preselected multiplier selected from 0, 1, 2, and 4;

an up/down counter, coupled to said multiplication circuit, for counting pulses in the output of said multiplication circuit, the count of said up/down counter representing the position of the shaft of the motor;

an index position acquirer, coupled to said up/down counter, for acquiring the index position of said position encoder for the servo motor to reset to a home position;

a control code register, for storing control codes for internal control of said chip device;

a status register for recording current status of said chip device;

a multiplexer, responsive to a selection signal from a CPU governing the operation of said chip device, for selectively outputting the output of said index position acquirer, the output of said control code register, and the output of said status register; and a control logic circuit for generating control signals for control of said chip device.

11. A servo motor positioning control and position recording chip device of claim 10, further comprising, when working in the first mode, a counter/status register, coupled to said up/down counter, for recording the status of said up/down counter when said up/down counter overflows; and a read/write logic circuit, coupled to said counter/status register, for read out data from and write data into said counter/status register.

12. A servo motor positioning control and position recording chip device of claim 10, further comprising, when working in the first mode, a pulse width modulator, coupled to said multiplication circuit, for increasing the width of the pulses in the output of said multiplication circuit and thereby generating an output to an external frequency-to-voltage converter to generate a simulation of the motor speed.

13. A servo motor positioning control and position recording chip device of claim 10, further comprising, when working in the first mode, a position counter, coupled to said multiplication circuit, for counting the number of pulses from said position encoder, the count of the pulses representing the current position of the shaft of the motor.

14. A servo motor positioning control and position recording chip device of claim 10, wherein said position encoder is a quadratic incremental encoder.

15. A servo motor positioning control and position recording chip device of claim 10, wherein, when working in the first mode, said counter counts the output pulses from said second programmable counter up to 4095 and thereby generates an actuating signal EDINT/.

16. A servo motor positioning control and position recording chip device of claim 10, wherein, when working in the second mode, said the multiplication circuit multiplies the A/B phase signal by a multiplier of either 0, 1, 2, or 4 to thereby convert the phase signal to a pulse signal for external monitoring of the operation of said chip device.

* * * * *